United States Patent [19]

Egawa et al.

[11] Patent Number: 5,159,184

[45] Date of Patent: Oct. 27, 1992

[54] APPARATUS FOR CONTROLLING THE INTENSITY OF A LASER BEAM EMITTED FROM A SEMICONDUCTOR LASER UNIT

[75] Inventors: Jiro Egawa, Yokosuka; Kunihiko Miura, Hiratsuka, both of Japan

[73] Assignee: Kabushiki Kaisha Toshiba, Kawasaki, Japan

[21] Appl. No.: 634,436

[22] Filed: Dec. 27, 1990

[30] Foreign Application Priority Data

Dec. 28, 1989 [JP] Japan .................................. 1-338418

[51] Int. Cl.⁵ .............................................. G01J 1/32
[52] U.S. Cl. ...................................... 250/205; 250/235
[58] Field of Search ........ 250/205, 235, 236, 214 AG; 358/475, 481, 494

[56] References Cited

U.S. PATENT DOCUMENTS

| | | | |
|---|---|---|---|
| 4,059,833 | 11/1977 | Kitamura et al. | 358/481 |
| 4,201,994 | 5/1980 | Hoshito et al. | 358/481 |
| 4,443,695 | 4/1984 | Kitamura | 250/205 |
| 4,695,714 | 9/1987 | Kimizuka et al. | 250/205 |
| 4,845,358 | 7/1989 | Asada | 250/235 |
| 4,853,710 | 8/1989 | Shimada et al. | 358/494 |
| 4,855,988 | 8/1989 | Shinbayashi et al. | 250/205 |
| 4,935,615 | 6/1990 | Yoshida Eiichi et al. | 250/235 |

Primary Examiner—David C. Nelms
Assistant Examiner—John R. Lee
Attorney, Agent, or Firm—Foley & Lardner

[57] ABSTRACT

In an apparatus for adjusting the intensity of a light beam, a first driving current which is stepwisely increased in a first cycle is supplied to a semiconductor laser. The light beam is deflected to scan a photosensitive drum and is detected to generate a positional signal by a photodetector outside of the drum. The intensity of the light beam is also detected by a monitor detector and compared with a predetermined target intensity. The comparison result is latched in a latch circuit to determine a first drive signal. When the intensity of the light beam reaches the target intensity after the generation of the positional signal, a second drive signal is generated in a second cycle longer than the first cycle instead of the first drive signal and is supplied to the semiconductor laser. The second drive signal is determined in accordance with the comparison result latched in the latch circuit.

6 Claims, 7 Drawing Sheets

APPARATUS FOR CONTROLLING THE INTENSITY OF A LASER BEAM EMITTED FROM A SEMICONDUCTOR LASER UNIT

BACKGROUND OF THE INVENTION

1. Field of the Invention

The present invention relates to an apparatus which controls the intensity of a laser beam emitted from a laser unit, and more particularly to a beam intensity-controlling apparatus adapted for use with a semiconductor laser unit incorporated in an image-forming apparatus, such as a laser printer or a digital copying machine.

2. Description of the Related Art

In recent years, an electrophotographic laser printer has been developed, which scans a photosensitive surface with a laser beam emitted from a laser unit for the purpose of exposure and which prints images and/or characters by utilization of an electrophotographic process. In this type of laser printer, the laser unit is a semiconductor laser unit. In general, the beam intensity of the laser beam emitted from the semiconductor laser unit has to be stabilized by a control device since the beam intensity is likely to vary in accordance with temperature.

There are various types of known control systems which can control the intensity of the laser beam emitted from the semiconductor laser unit. Of the known control systems, the control system which employs a general-purpose microcomputer or microprocessor incorporating an A/D converter is considered a low-cost type. In this type of control system, the semiconductor laser is energized to emit the laser beam and a detector detects the beam intensity of a laser beam during the interval between the image-recording operation performed with respect to a given page and the image-recording operation performed with respect to the succeeding page, and the detected beam intensity is supplied to the A/D converter, for reading. The beam intensity read by the A/D converter is compared with a reference signal by the microcomputer and its peripheral circuits, and the current used for the driving of the semiconductor laser unit is controlled on the basis of the comparison. In this manner, the intensity of the laser beam emitted from the semiconductor laser unit is stabilized.

According to the conventional control system mentioned above, the intensity of the laser beam emitted from the semiconductor laser unit is stabilized by causing the semiconductor laser unit to emit a laser beam in the interval which is between the image-recording operations performed with respect to two successive pages, i.e., in the interval in which the image-recording operation is not performed. If this control system is used in a certain type of image-forming apparatus (e.g., a laser printer or a digital copying machine to which a reversal development system is applied), the laser beam emitted in the interval between the image-recording operations may fall on a recording region. If this occurs, the image on the recording region is developed with toner and toner is used in vain.

According to another type of control system which may solve the above problem, the intensity of a laser beam emitted from the semiconductor laser unit is stabilized, with the semiconductor laser unit being energized in the region other than the recording region. According to this control system, however, the time during which the semiconductor laser unit is energized is comparatively short, and the A/D converter incorporated in the general-purpose microcomputer requires a long time for reliably reading the detected beam intensity of the semiconductor laser unit. This being so, it is necessary to employ a high-speed A/D converter, i.e., a costly A/D converter. It is also necessary to employ a high-speed microcomputer since high-speed processing is required from the reading of the detected beam intensity to the determination of the driving current to be supplied to the semiconductor laser unit.

In the conventional control apparatuses, the beam intensity of the light beam emitted from the semiconductor laser is controlled in a predetermined cycle. If the time required from the start of the beam intensity to the attainment of the target beam intensity is short, then the cycle of the image intensity control should be shortened, accordingly. In other words, the time intervals at which the image intensity is controlled should be shortened. It should also be noted that the beam intensity control continues in the same cycle even after the attainment of the target beam intensity. In the case where the beam intensity control is carried out simultaneously with the image formation control executed by the image formation-controlling microcomputer of the image-forming apparatus, the image information control has to be executed with the beam intensity control being carried out in the predetermined cycle. Since the processing speed of a general-purpose microcomputer is too slow for this purpose, it is necessary to employ a high-speed microcomputer, making the manufacturing cost of the control apparatus high.

SUMMARY OF THE INVENTION

Accordingly, an object of the present invention is to provide a beam intensity-controlling apparatus capable of controlling the intensity of a laser beam emitted from a semiconductor laser unit, in a stable manner and with high responsiveness.

Another object of the present invention is to provide a beam intensity-controlling apparatus for a semiconductor laser unit, which is capable of shortening the time between the start of the beam intensity control and the attainment of a target beam intensity, with no need to employ a high-speed microcomputer.

Still another object of the present invention is to provide a beam intensity controller for a laser oscillator, which controls the beam intensity of the laser beam of the laser oscillator in response to the input of a command for starting image formation and which permits the laser beam to attain a target beam intensity within a comparatively short time from the start of beam intensity control.

According to the present invention, there is provided an apparatus for adjusting the beam intensity of a light beam, comprising:

light beam generating means for generating the light beam;

first driving means for generating a first driving signal in a first cycle to drive the light beam-generating means so as to increase the beam intensity of the light beam generated by the light beam generating means;

means for detecting the intensity of the light beam generated by the light beam generating means;

means for comparing the intensity of the light beam detected by the detecting means with a predetermined target intensity of the light beam; and second driving means for generating a second driving signal in a second cycle which is different from the first cycle, when the intensity of the light beam detected by the detecting means corresponds to the target intensity so as to drive the light beam-generating means and control the beam intensity of the light beam generated by the generating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

One embodiment of the present invention will now be described, with reference to the accompanying drawings.

Figure 1:
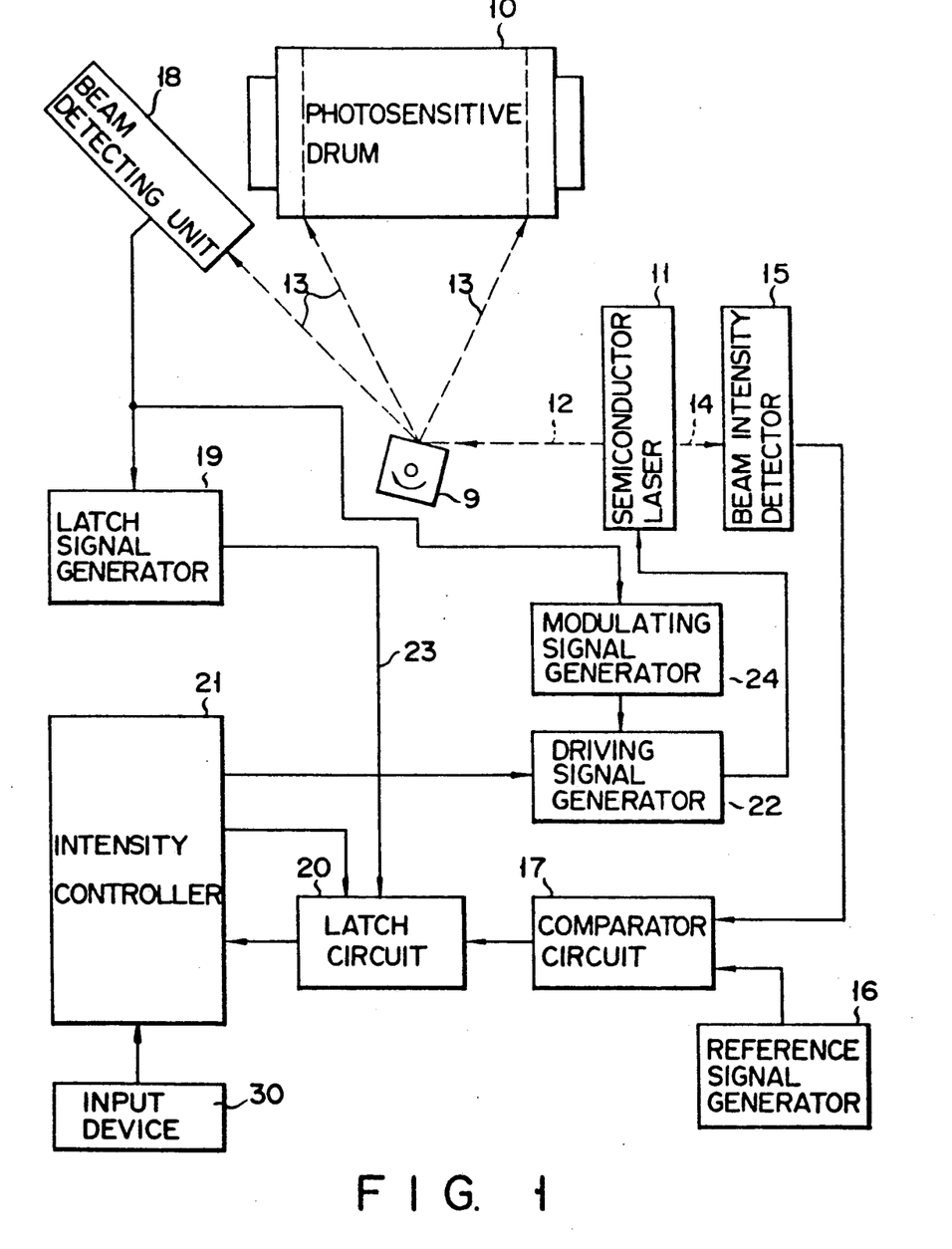
FIG. 1 is a block circuit diagram of an apparatus according to one embodiment of the present invention, which apparatus controls the intensity of the laser beam emitted from a semiconductor laser unit.

FIG. 1 is a block circuit diagram of an apparatus according to one embodiment of the present invention, the apparatus being designed for controlling the intensity of the laser beam emitted from a semiconductor laser unit. In the apparatus shown in FIG. 1, the laser beam emitted from a semiconductor laser 11 is directed to a polygonal mirror 9, as is indicated by reference numeral 12, and is then deflected toward a photosensitive drum 10. The photosensitive drum 10 is scanned with the laser beam 12, so that an electrostatic latent image is formed on the photosensitive drum 10. When the laser beam 12 deflected by the polygonal mirror 9 is directed to the region which is outside the recording region of the photosensitive drum 10, a beam-detecting unit 18 detects a scanning position or point of the laser beam and outputs a beam detection signal The semiconductor laser 11 is driven by a drive signal generator 22. This drive signal generator 22 receives a modulation signal from a modulating signal generator 24 in synchronism with the output of the beam detection signal. In response to the modulation signal, the drive signal generator 22 drives the semiconductor laser 11 by supplying a current thereto, such that image information is recorded on the predetermined region on the photosensitive drum 10 by use of the laser beam. The laser beam emitted from the semiconductor laser 11 is also directed to a beam intensity detector 15, as is indicated by reference numeral 14. The beam intensity detector 15 detects the beam intensity of the laser beam directed thereto and supplies a detection signal to a comparator circuit 17. The comparator circuit 17 compares the detection signal supplied from the beam intensity detector 15 with a reference signal supplied from a reference signal generator 16, and outputs a comparison signal. A latch signal generator 19, which is connected to the beam detecting unit 18, generates a latch signal 23 in response to the beam detection signal output by the beam detecting unit 18, i.e., in synchronism with the time at which the laser beam deflected by the polygonal mirror 9 has reached the region outside the recording region. A latch circuit 20 is connected to the comparator circuit 17, and latches the comparison signal supplied from the comparator circuit 17, in response to the latch signal 23.

An intensity controller 21 determines the driving current to be supplied to the driving signal generator 22 in accordance with the comparison signal latched in the latch circuit 20. In this manner, the intensity of the laser beam emitted from the semiconductor laser 11 is controlled to be constant.

Figure 2:
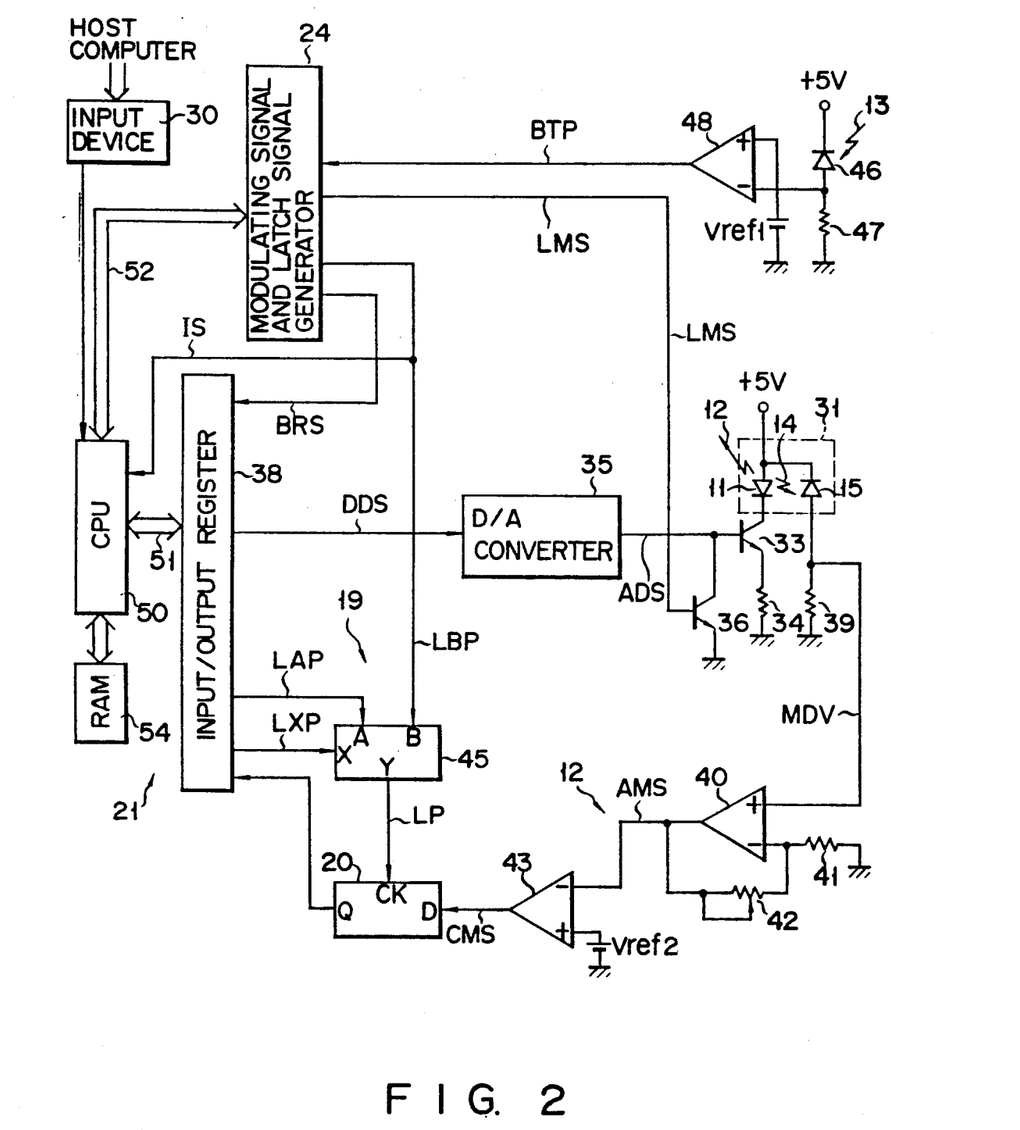
FIG. 2 is a block circuit diagram showing details of part of the apparatus shown in FIG. 1.

An input device 30 (e.g., a host computer) is connected to the intensity controller 21. A print command for starting a printing operation is entered from the input device 30. In response to the print command, the circuit shown in FIG. 1 starts a beam intensity control. As is shown in FIG. 2, the intensity controller 21 comprises a memory device 54 constituted by a RAM, for example. This memory device 54 stores driving data corresponding to a preset drive current which starts to energize the semiconductor laser unit 11 in response to a print command in a print ready mode. The preset drive current is determined in a warming-up mode on the basis warming-up mode is started when the printer apparatus is energized or turned on and is continued until the print-ready mode is established. During this warming-up mode, the drive current is stepwisely increased and the beam intensity of the semiconductor laser 11 is also increased in accordance with a control program stored in a ROM (not shown) so that the beam intensity reaches to a target value and the drive current corresponding the target beam intensity is determined. Thus, the preset drive current is determined in proportion to the drive current corresponding to the target beam intensity and the drive data corresponding to the preset driving current is stored in the RAM 54. Thereafter, the drive current is lowered, the print heater is ready and the warming-up mode is finished so that the print ready mode is established.

In the print ready mode, when the print command is entered from the input device 30, the preset drive current is read out from the memory device 54 as the drive current data and the preset current is applied to the semiconductor laser unit 11 from the driving signal generator 22. Thus, the intensity controller 21 starts to control the semiconductor laser 11 at a first cycle until the beam intensity of the laser beam output from the semiconductor laser 11 attains the target beam intensity. That is, the intensity controller 21 controls the driving signal generator 22 in such a manner that the drive current from the driving signal generator 22 is stepwisely increased on the first cycle P1, and generates a latch signal to the latch circuit in the first cycle. Therefore, the comparison signal output from the latch circuit 17 is latched in the latch circuit 20 in the predetermined cycle, and the comparison signal latched in the intensity controller 21 is latched in the first cycle P1. When the beam intensity reaches to the target value, a comparison signal is latched in the latch circuit 20 in response to a latch signal whose period corresponds to that of the beam detection signal. In accordance with the latched comparison signal, the driving current of the driving signal generator 22 is determined. Therefore, the driving current is updated in a second cycle P2, which is shorter than the first cycle P1, and the beam intensity of the laser beam emitted from the semiconductor laser 11 is uniformly controlled.

FIG. 2 is a block circuit diagram illustrating a detailed structure of the intensity controller 21 shown in FIG. 1, along with its peripheral circuits. As is shown in FIG. 2, a semiconductor laser unit 31 is made up of a laser diode 11 and a photodiode 15. The laser diode 11 constitutes the semiconductor laser mentioned above, while the photodiode 15 constitutes a beam intensity detector which detects the intensity of a laser beam output from the laser diode 11, for monitoring. The laser diode 11 is driven with a constant current which is supplied from a constant-current circuit made up of a transistor 33 and a resistor 34. The output terminal of a D/A converter 35, which converts a digital driving signal DDS to an analog driving signal ADS, is connected to the base of transistor 33. The collector of a transistor 36 is also connected to the base of transistor 33. With this circuit arrangement, the driving current flowing through the laser diode 11 varies in proportion to the output voltage ADS of the D/A converter 35.

Transistor 36 is repeatedly turned on or off in accordance with a laser-modulating signal LMS output from the modulating signal generator 24, so that the laser diode 11 is modulated and emits an intensity-modulated laser beam 12. In the circuit of this embodiment, the laser diode 11 is de-energized when the laser-modulating signal LMS is at the high level, and is energized and emits a laser beam when the laser-modulating signal LMS is at the low level. In the D/A converter 35, the digital driving signal DDS (a current signal) output from an input/output register 38 is converted into the analog driving signal ADS (a voltage signal).

A current flowing through the monitoring photodiode 15 varies in proportion to the intensity of the laser beam 14 generated by the laser diode 11. To convert the current flowing through the photodiode 15 into a voltage, a resistor 39 is connected between the photodiode 15 and the ground. A detection voltage MDV obtained by resistor 39 is supplied to the comparator circuit 17, which is made up of an operational amplifier 40, a resistor 41, a variable resistor 42, and a comparator 43. More specifically, the detection voltage MDV is supplied to the operational amplifier 40 of the amplifier circuit 17. This amplifier 40 constitutes a non-inversion type amplifier, by which the detection voltage MDV is amplified without being inverted. It should be noted that the variable resistor 42 is employed for the purpose of adjusting the amplification factor. The current flowing through the photodiode 15 may differ, depending upon the characteristic variation of the laser diode 11 so that the detection voltage MDV may differ. However, the amplified signal AMS from the operational amplifier 40 can be so corrected such that the amplified signal corresponds to the intensity of the laser beam emitted from the laser diode 11 by adequately determining the amplification factor, i.e., by adjusting the resistance of the variable resistor. An amplified signal AMS, produced from the operational amplifier 40, is supplied to the negative input terminal of the comparator 43, and is compared with a reference voltage Vref2 supplied to the positive input terminal of the comparator 43. The level of the reference voltage Vref2 is determined in accordance with the desirable target intensity of the laser beam emitted from the laser diode 11. If the level of the output AMS of the operation amplifier 40 is lower than that of the reference voltage Vref2, the output CMS of the comparator 43 becomes high in level, on the assumption that the laser beam has not yet attained the target beam intensity. If the level of the output AMS of the operation amplifier 40 exceeds the level of the reference voltage Vref2, the output CMS of the comparator 43 becomes low in level, on the assumption that the intensity of the laser beam has exceeded the target beam intensity. A comparison signal CMS output from the comparator 43 is supplied to the latch circuit 20. The comparison signal CMS is latched in the latch circuit 20 in synchronism with an input latch pulse Lp supplied from a selector 45. An output of this latch circuit 20 is supplied to the input/output register 38, and is then processed by a CPU 50, which controls of the entire printer.

The selector 45 selects either an input latch pulse LAP or an input latch pulse LBP, in accordance with a latch pulse-switching signal LXP supplied from the input/output register 38. The latch pulse LAP is output from the input/output register 38 in the first cycle P1, while the latch pulse LBP is output from the modulating signal generator 24 in the second cycle P2 (which is longer than the first cycle P1). In the case of this embodiment, the selector 45 selects input latch pulse LAP if the latch pulse-switching signal LXP is low in level, and selects input latch pulse LBP if the latch pulse-selecting signal LXP is high in level.

The beam detecting unit 18 includes a pin diode 46 which detects a scanning point or position which is scanned with the scanning laser beam 13. When the scanning laser beam 12 is incident on the pin diode 46, this pin diode 46 generates a current signal which is proportional to the intensity of the incident laser beam. The current signal is converted into a voltage signal by resistor 47. The voltage signal, thus obtained, is supplied to the negative terminal of a comparator 48, and is compared with a reference voltage Vref1 which is supplied to the positive terminal of the comparator 48 The result of this comparison is output as a negative pulse beam-detecting signal BTP, and is supplied to the modulating signal generator 24.

Upon receipt of the beam-detecting signal BTP, the modulating signal generator 24 changes the level of a beam-detection-ready signal BRS from low to high. (The beam-detection-ready signal BRS is supplied from the modulating signal generator 24 to the input/output register 38, to inform the input/output register 38 that the beam detection is ready.) The latch pulse-selecting signal LXP output from the input/output register 38 has a low level when the laser beam emitted from the laser diode 11 has a level lower than the target intensity and has a high level when the laser beam has been set to the target value. When the beam-detecting signal BTP is output, the modulating signal generator 24 generates a forcible latch pulse LBP on the assumption that the laser beam has reached the region outside the recording region. The input latch pulse LBP is supplied to the interruption terminal of the CPU 50 as an interruption signal IS. An internal bus 51 of the CPU 50 is connected to the input/output register 38, and to the modulating signal generator 24 by way of an internal bus 52.

The operation of the circuit shown in FIG. 2 will now be described, with reference to the timing charts shown in FIGS. 3A–3K and FIGS. 4A–4D and the flowcharts shown in FIGS. 5A and 5B.

Figure 3A:
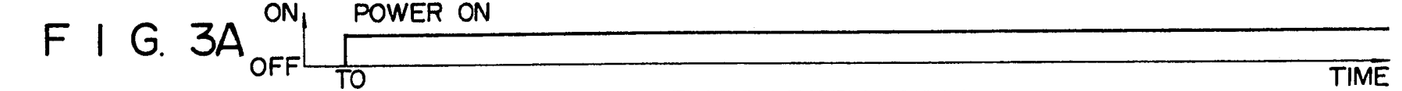
FIGS. 3A-3K are timing charts for explaining the operation of the apparatus shown in FIG. 2.
Figure 3B:
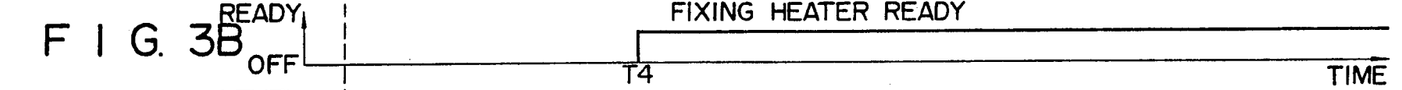
Figure 3C:
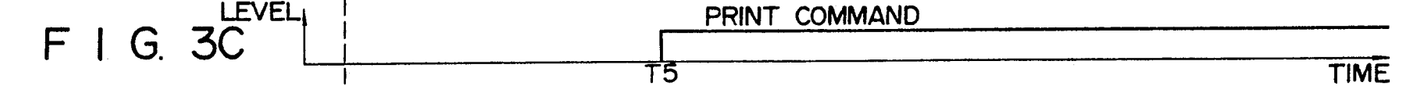
Figure 3D:
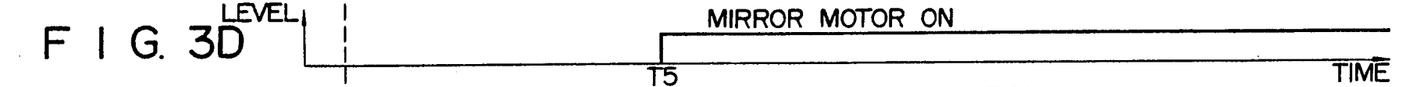
Figure 5A:
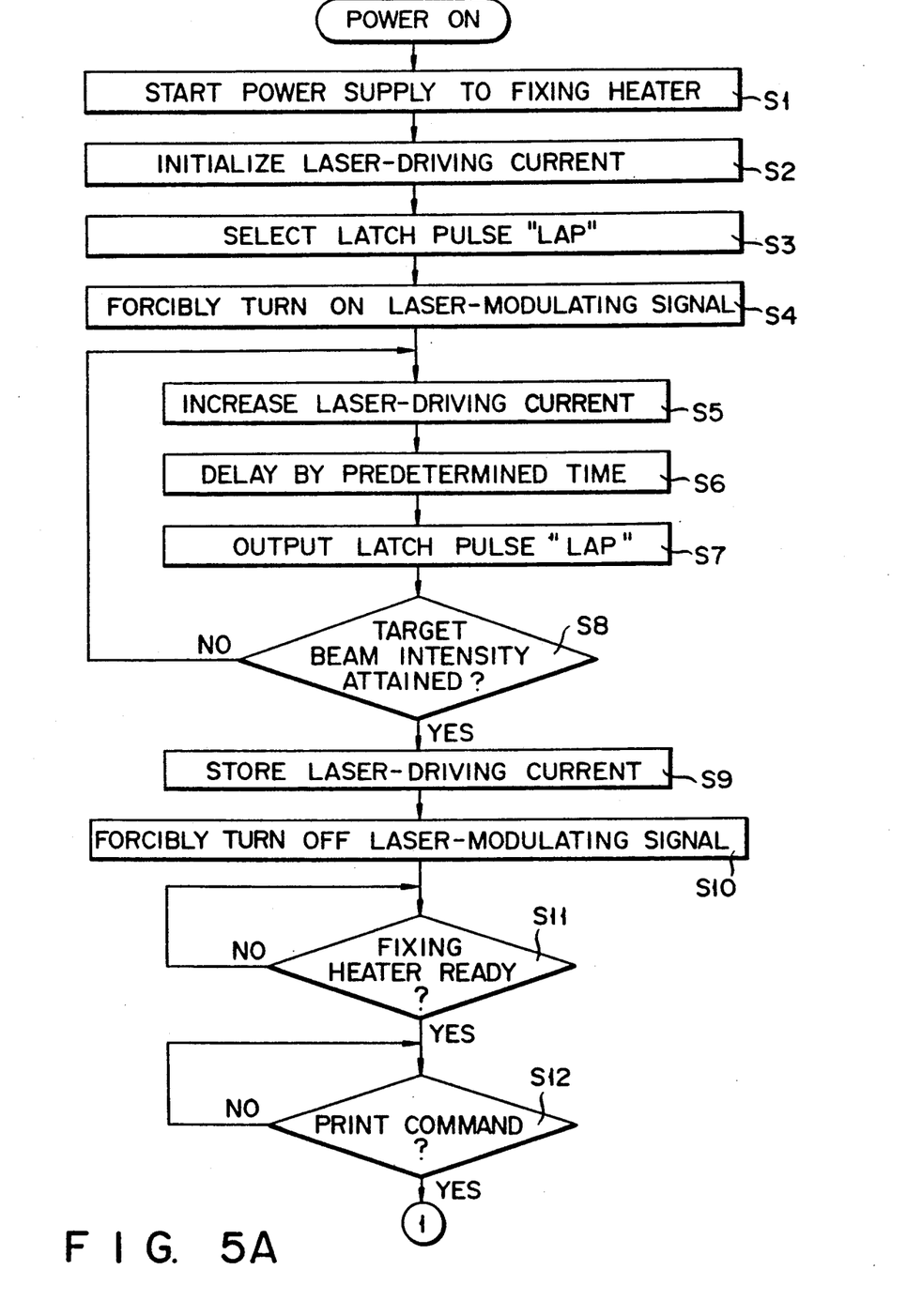
FIGS. 5A and 5B are flowcharts for explaining the operation of the apparatus shown in FIG. 2.

Referring to FIG. 5A, when the power source is turned on at time T0 (FIG. 3A), a warming-up operation of the apparatus is started. In other words, the current supply to a fixing heater is started in step S1. The fixing heater becomes ready for fixing at time T4 (FIG. 3B), which is a predetermined time after time T0. After time T0, the laser-driving current output from the input/output register 38 is initialized in step S2. Next, in step S3, the selector 45 selects the input latch pulse LAP coming from the register 38, in accordance with the latch pulse-selecting signal LXP (FIG. 3H) output from the input/output register 38. As is shown in FIG. 3I, the supply of the latch pulse LAP to the latch circuit 20 is started from time T2. Next, in step S4, the laser-modulating signal output from the modulating signal generator 24 is forcibly turned on, as is indicated in FIG. 3F, and the low-level driving signal is applied to transistor 36, thereby turning off this transistor 36. Next, in step S5, the laser-driving current is increased with a predetermined increment from time T1. The increased laser-driving current is output from the input/output register 38, and is then supplied to the D/A converter 35, for D/A conversion, whereby the laser-driving current is converted into a voltage signal ADS (FIG. 3K). This voltage signal ADS is applied to transistor 33, so that the current supply to the laser diode 11 is started.

At time T2, which is a time delayed by a predetermined length of time in step S6, the generation of the input latch pulse LAP is started in step S7. In synchronism with the input latch pulse Lp from the selector 45, the comparison signal output from the comparator 43 is latched in the latch circuit 20. Next, in step S8, the CPU 50 determines whether or not the laser beam emitted from the semiconductor laser 11 has attained the target beam intensity, on the basis of the comparison signal latched in the latch circuit 20. The attainment of the target beam intensity means that the output voltage of the comparator 43 has reached the same level as the reference voltage Vref2 of the comparator 43. Accordingly, the output of the comparator 43 is changed from "1" to "0".

If it is determined in step S8 that the laser beam has not yet attained the target beam intensity, then the flow returns to step S5, and steps S5–S8 are repeated until the target beam intensity is attained. If it is determined in step S8 that the target beam intensity has been attained, then the flow advances to step S9. In this step S9, the value of the laser-driving current is stored in RAM 54. Next, in step S10, the laser-modulating signal LMS is forcibly turned off, so that the laser-modulating signal is maintained at a high level from time T3 in the manner shown in FIG. 3F and the output of the D/A converter 35 drops in level at time T3 in the manner shown in FIG. 3K.

In step S11, a check is made to see whether the fixing heater is ready or not. This check is repeated until the fixing heater becomes ready, i.e., until the warming-up operation is completed. When the fixing heater becomes ready and the warming-up operation completed at time T4, as is indicated in FIG. 3B, the CPU 50 waits, in step S12, for a print command to be externally entered from the external apparatus, for example from the host computer 30. When the CPU 50 receives the print command via the input device 30 at time T5, as is indicated in FIG. 3C, the mirror motor is turned on at time T5 (FIG. 3D) in step S13, and the value of the laser-driving signal (which was stored in step S9) is read out of the RAM 54 in step S14. Next, In step S15, the preset drive current stored in RAM 54 and having a value which is 1/n of the value of the laser-driving current corresponding to the target beam intensity is output from the input/output register 38 under the control of the CPU 50. In step S16, the laser-modulating signal is forcibly turned on at time T6 (FIG. 3F) and is maintained at a low level. In step S17, the laser-driving current is increased with a predetermined increment in the first cycle P1 from time T6, as is indicated in FIG. 3K.

The comparison signal from the comparator 43 is latched in the latch circuit 20, when the input latch pulse LAP is output from the input and output register 38 in step S18-2 at a time delayed by a predetermined length of time from time T6 in step S18-1. Next, in step 19, the CPU determines whether the laser beam emitted from the semiconductor laser 11 is set to have a target beam intensity in accordance with the comparison signal from the comparator. The state where the laser beam is set to have the target intensity is a state where the output voltage from the operational amplifier 40 exceeds the level of the reference voltage Vref2 of the comparator 43. If it is determined in step S19 that the laser beam is not set to have the target beam intensity, then the flow returns to step S17, and the same operation is repeated until the laser beam is set to have the target beam intensity. That is, the drive current for driving the semiconductor laser 11 is gradually increased so that the beam intensity of the laser beam is gradually increased.

When it is determined in step S19 that the laser beam is set to have the target beam intensity at time T7, step S20 is executed, wherein the laser-modulating signal is forcibly turned off at time T7, as is indicated in FIG. 3F. The modulating signal generator r 24 outputs a beam-detection-ready signal. Further, the input/output register 38 outputs a latch pulse-switching signal LXP at time T7, as is indicated in FIG. 3H. In step S21, therefore, the selector 45 selects input latch pulse LBP instead of input latch pulse LAP. When a predetermined length of time has elapsed from time T7, the laser beam is directed to the region outside of the photosensitive drum 10. At that time (i.e., at time T8), the level of the modulation signal generated by the modulating signal generator 24 is changed from high to low. Accordingly, the semiconductor laser emits a laser beam, for sampling. As is indicated in FIG. 3J, therefore, the latch pulse Lp corresponding to input latch pulse LBP is supplied from the selector 45 to the latch circuit 20 in the second cycle P2.

After interruption is allowed in step S22, a check is made in step S23 to see whether or not the input latch pulse LBP which the CPU 50 receives is an interruption signal IS. This check is repeated until the CPU 50 identifies the interruption signal IS. When the CPU 50 identifies the interruption signal IS, the comparison signal output from the comparator 43 is latched in the latch circuit 20 by the latch pulse LBP. Next, in step S24, the CPU 50 determines whether or not the laser beam has attained the target beam intensity, on the basis of the comparison signal latched in the latch circuit 20. If the target beam intensity has not yet been attained, the laser-driving current is increased again with a predetermined increment in the second cycle P2 in step S25, and the increased laser-driving current is supplied to the D/A converter 35. Accordingly, the voltage output from the D/A converter 35 is increased, as is indicated in FIG. 3K. Thereafter, the flow returns to step S23 and the above operation is repeated until the target beam intensity is attained. When the target beam intensity is attained, the laser-driving current is decreased with a predetermined decrement in step S26, so that the voltage output from the D/A converter 35 drops, as is indicated in FIG. 3K. Thereafter, the flow returns to step S23. That is, at time T9, the voltage output from the D/A converter 35 is increased, the beam-detection signal BTP is generated from the comparator 48, and the semiconductor laser 11 is de-energized, with the level of the laser-modulating signal LMS being changed from low to high. At time T10, the laser 11 is energized again, and the reference signal pertaining to a monitoring beam is latched. If the target beam intensity has not yet been attained, the voltage output from the D/A converter 35 is increased at time T11. If the target beam intensity has been attained, the voltage output from the D/A converter 35 is decreased at time T12. In this manner, the voltage output from the D/A converter is repeatedly increased or decreased in the second cycle P2, which is longer than the first cycle P1. That is, after the target beam intensity is attained, the beam intensity of the semiconductor laser unit 11 is controlled in the second cycle each time an interruption signal is received by the CPU 50.

Figure 3E:
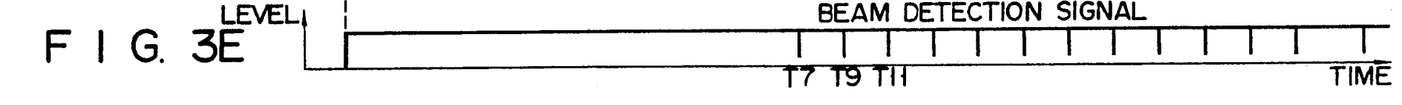
Figure 3F:
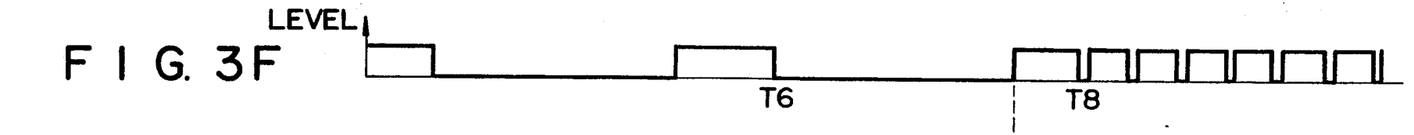
Figure 3G:
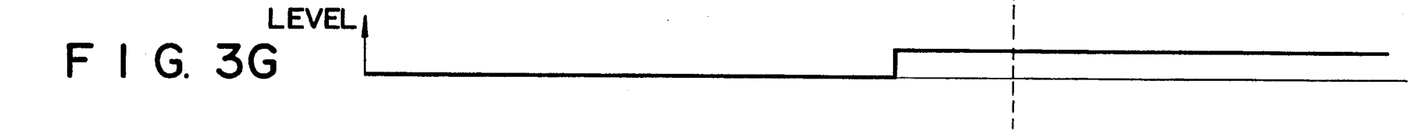
Figure 3H:
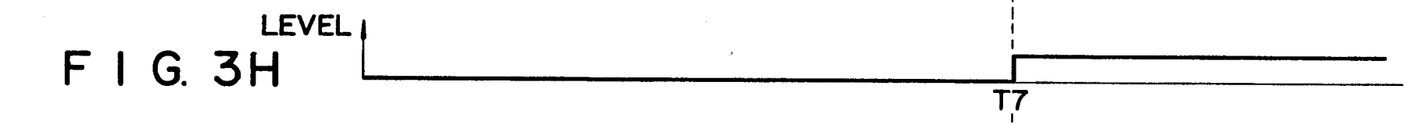
Figure 3I:
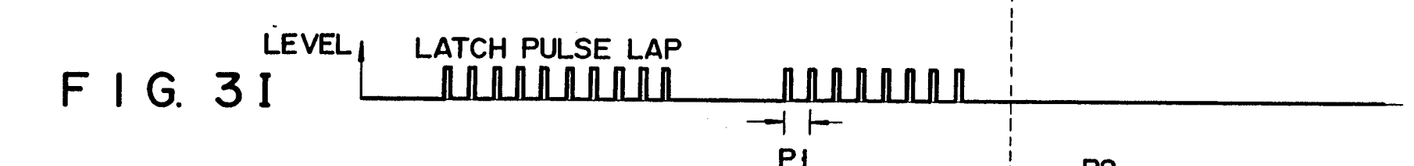
Figure 3J:
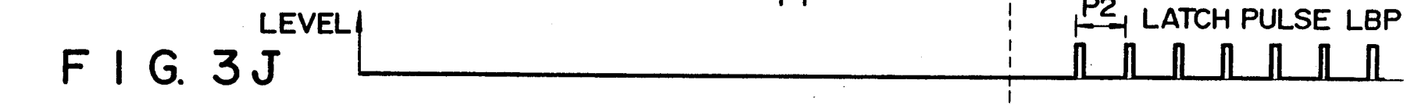
Figure 3K:
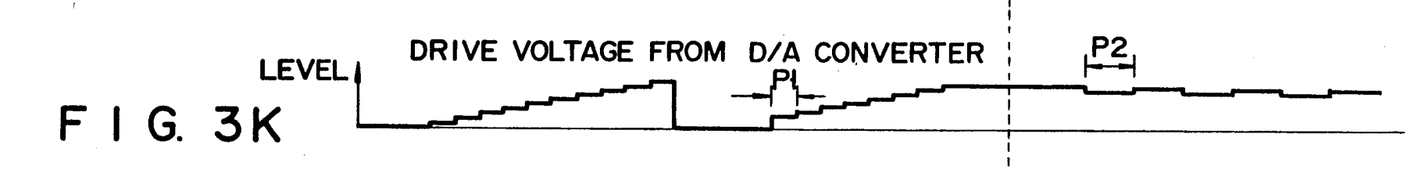
Figure 4A:
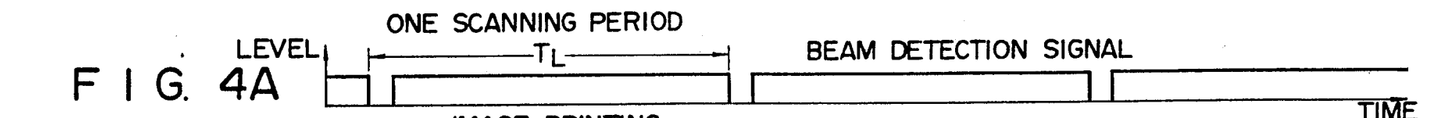
FIGS. 4A-4D are partially-enlarged timing charts corresponding to the timing charts shown in FIGS. 3E, 3F, 3J and 3K, respectively.
Figure 4B:
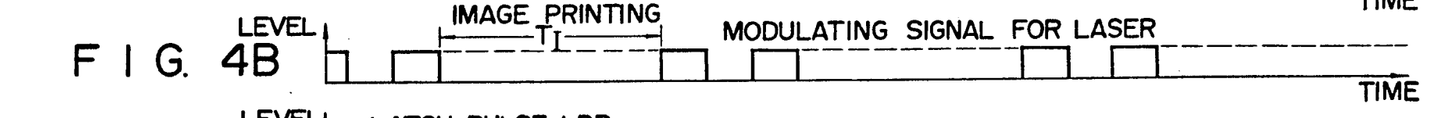
Figure 4C:
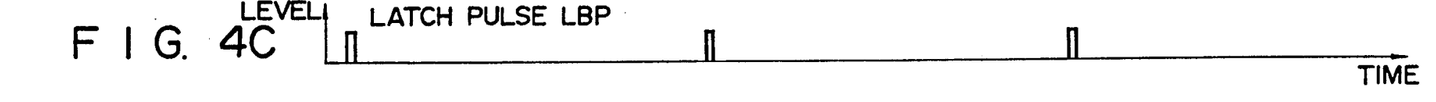
Figure 4D:
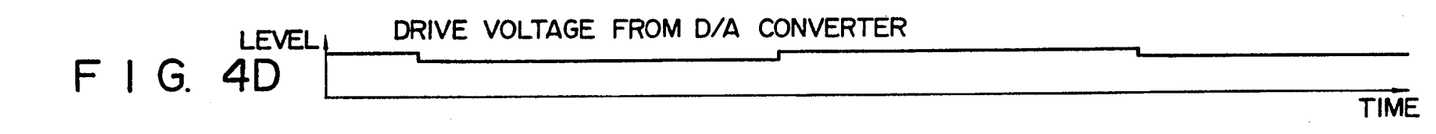
Figure 5B:
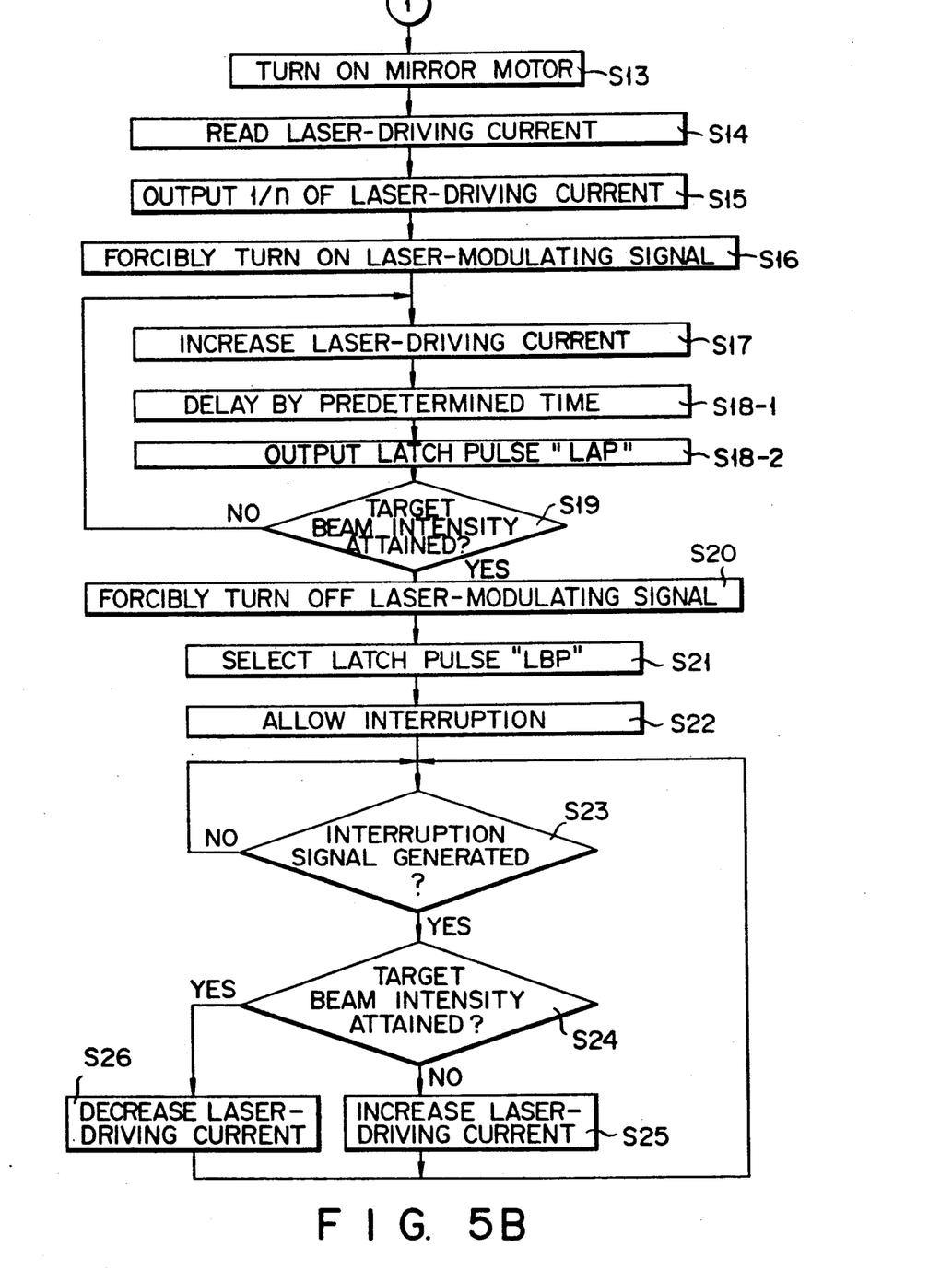

FIGS. 4A-4D are enlarged timing charts, of which FIG. 4A corresponds to FIG. 3E and shows a beam-detecting signal produced after the attainment of the target beam intensity, FIG. 4B corresponds to FIG. 3F and shows a modulation signal, FIG. 4C corresponds to FIG. 3J and shows an input latch pulse LB, and FIG. 4D corresponds to FIG. 3K and shows a voltage signal produced from the D/A converter 35. As is indicated in FIG. 4A, the laser beam scans one line during period TL, in which a beam-detecting signal is detected. As is indicated in FIG. 4B, the modulation signal is modulated with externally-supplied image information in period TI, to thereby record an image on the photosensitive drum 10.

As detailed above, the beam amount-controlling apparatus of the present invention controls the beam amount in a short cycle (i.e., at short time intervals) until the amount of laser beam emitted from the laser oscillator exceeds a target value. After the amount of laser beam exceeds the target value, the beam intensity control is executed in a long cycle (i.e., at long time intervals). Therefore, the time between the start of the beam amount control and the attainment of the target beam amount is shortened, with no need to employ a high-speed microcomputer.

In addition, the beam amount-controlling apparatus of the present invention controls the amount of beam emitted from the laser oscillator in a predetermined cycle, and controls the beam amount on the basis of a beam-detection signal after the beam amount exceeds a target value. Therefore, the time needed from the start of beam amount control to the attainment of the target beam amount is shortened, with no need to employ a high-speed microcomputer. Further, the amount of light beam emitted from the laser oscillator can be reliably controlled in regions other than the image-formation region, without causing damage to the laser oscillator or degrading the performance of the laser oscillator.

The beam intensity-controlling apparatus of the present invention controls the beam intensity of a semiconductor laser circuit in a predetermined first cycle until the beam intensity attains a target value. After the beam intensity attains the target value, the apparatus controls the beam intensity in a second cycle in accordance with a beam-detection signal. Therefore, the time needed from the start of beam intensity control to the attainment of the target beam intensity is shortened, with no need to employ a high-speed microcomputer. Further, the intensity of the light beam emitted from the laser oscillator can be reliably controlled in regions other than the image-formation region, without causing damage to the semiconductor laser unit or degrading the performance of the semiconductor laser unit.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for adjusting the beam intensity of a light beam generated from a light beam generating unit, the apparatus comprising:
   beam intensity detecting means for detecting a beam intensity of a light beam generated from a light beam generating unit;
   comparing means for comparing the beam intensity of the light beam detected by the beam intensity detecting means with a predetermined reference level and for outputting a comparison result;
   latching means for latching the comparison result from the comparing means and for outputting a latched comparison result; and
   intensity control means for causing the latching means to latch the comparison result in a first cycle when the beam intensity is smaller than the predetermined reference level and in a second cycle, which is longer than the first cycle, when the beam intensity reaches the predetermined reference level and for controlling the light beam generating unit in accordance with the latched comparison result.

2. An apparatus as set forth in claim 1 further comprising:
   a beam detecting unit to generate a beam detection signal when the light beam is outside of a recording region.

3. An apparatus as set forth in claim 2 wherein the intensity control means utilizes the beam detection signal to determine when to latch the comparison result.

4. An apparatus for controlling the intensity of a light beam generated from a light beam generating unit, the apparatus comprising:
   beam intensity detecting means for detecting a beam intensity of a light beam from a light beam generating unit;
   comparing means for comparing the beam intensity of the light beam detected by the beam intensity detecting means with a reference value defining a target intensity of the light beam generated from the light beam generating unit and for outputting a comparison result;
   latching means for latching a control signal corresponding to the comparison result, the latching means cyclically latching the control signal in accordance with one of a first latch signal defining a first latch cycle and a second latch signal defining a second latch cycle which is longer than the first latch cycle; and intensity control means for providing the latching means with the first latch signal when the control signal indicates that the beam intensity of the light beam detected by the detecting means does not reach the target intensity and with the second latch signal when the control signal indicates that the beam intensity of the light beam detected by the beam intensity detecting means reaches the target intensity and for driving the light beam generating unit in accordance with the control signal latched by the latching means.

5. An apparatus as set forth in claim 4 further comprising:
a beam detecting unit to generate a beam detection signal when the light beam is outside of a recording region.

6. An apparatus as set forth in claim 5 wherein the intensity control means utilizes the beam detection signal to determine when to latch the comparison result.

* * * * *